Patented May 4, 1954

2,677,706

UNITED STATES PATENT OFFICE 2,677,706

PREPARATION OF N SUBSTITUTED FORMAMIDES

Marcello T. Giachino, Monroe, La., assignor to Commercial Solvents Corporation, Terre Haute, Ind., a corporation of Maryland No Drawing. Application August 16, 1951, Serial No. 242,181

8 Claims. (Cl. 260—561)

My invention relates to a method for the production of N-substituted formamides. More particularly it relates to an improved process for the production of monomethylformamide and dimethylformamide by reacting methylamines with carbon monoxide.

Dimethylformamide and monomethylformamide are colorless liquids having remarkable solvency toward many classes of compounds. They are miscible with water, ether, alcohols, esters, and ketones, as well as aromatic and chlorinated compounds. Dimethylformamide and monomethylformamide distill at atmospheric pressure essentially unchanged and without the formation of color or acidity. Dimethylformamide boils at 153° C. and monomethylformamide at 199° C. and thus the two compounds are easily separable by fractional distillation. Dimethylformamide is used in the solvent extraction of various petroleum fractions, and as a solvent in many and varied chemical processes. It is a solvent for acetylene which is presently shipped in acetone but which is twice as soluble in dimethylformamide as in acetone.

In the past, dimethylformamide and monomethylformamide have been most generally prepared by either reacting dimethylamine with formic acid, by reacting dimethylamine with methyl formate, or by reacting a mixture of ammonia and methanol with carbon monoxide under pressure. However, these processes are uneconomical in the use of formic acid and methyl formate as well as being dependent on supplies of these two materials which are not always sufficient to insure unlimited availability. Due to these considerations, dimethylformamide and monomethylformamide are not readily available materials and therefore have not been exploited to the full extent of their possibilities industrially.

I have now discovered a method for the catalytic production of dimethylformamide and monomethylformamide utilizing readily available materials. My new process, besides being economical in utilizing cheap, available raw materials, is also advantageous in its production of high conversions and good yields of methylformamides.

My new process consists essentially of the reaction of methylamines with carbon monoxide in the presence of a catalyst under elevated conditions of temperature and pressure. The process can be carried out in a continuous system or it can be conducted as a batch process, there being little difference in the conversions and yields obtained when continuous or batch systems are employed. Similarly, my new reaction can be carried out in the vapor phase or in the liquid phase with slightly better results being obtained with liquid phase operation. Other possible variations in my new process are hereinafter more particularly described.

More specifically, my invention consists of reacting carbon monoxide with monomethylamine, dimethylamine, or any mixture of monomethylamine, dimethylamine and trimethylamine including mixtures of two of these three methylamines in the presence of a catalyst under elevated conditions of temperature and pressure. It is to be noted that any mixture of the three methylamines can be employed in carrying out my new process and any one of the methylamines can be used as a starting material except trimethylamine which I have found to be essentially unreactive when used alone.

In carrying out my new reaction, I prefer to employ dimethylamine as the starting material in the reaction with carbon monoxide when dimethylformamide is primarily desired, and monomethylamine when monomethylformamide is desired. When mixtures of methylamines are employed as a starting material, a mixture of mono- and dimethylformamide results with one or the other predominating depending on whether mono- or dimethylamine predominates in the starting mixture, trimethylamine tending toward conversion to dimethylformamide when it is present in a starting mixture of methylamines. As for the carbon monoxide starting material, I prefer to use the carbon monoxide in the pure state since high purity leads to higher reaction rates though purity is usually not a limiting factor on conversion to dimethylformamide. Carbon monoxide contaminated with hydrogen, nitrogen, and methane has been used in the reaction without deleterious effect on the amount of dimethylformamide produced, but the presence of carbon dioxide results in formation of a methyl- or dimethylcarbonic salt thus reducing methylamine content available for the amide reaction.

The catalysts which I employ in carrying out my new reaction include cuprous chloride, cupric chloride, ammonium chloride, potassium acetate, and boron fluoride. I have found that these catalysts are particularly suitable for my reaction because, among other reasons, they are to a certain extent soluble in the reactants and/or in the reaction product; however, the reaction mixture has some tendency to crystallize upon cooling, although should such crystallization occur the reaction mixture may be warmed slightly to melt the reaction mass, whereupon the product can be separated from the reaction mixture. I have found that better dispersion of the catalyst in the reaction mass can be obtained by the use of a solvent for the catalyst though the use of such a solvent is not necessary in order to obtain good conversions and yields of dimethylformamide. Lower aliphatic alcohols such as for example methanol, and other widely used common solvents such as ethyl ether may be employed as solvents in my process. The main requirement for the solvent is that it be inert to the reaction mixture and to the product obtained.

In choosing a particular catalyst to be employed consideration should be given to which of the starting materials, so far as the amines are concerned, is employed. For example, when using dimethylamine I prefer to employ cuprous chloride as the catalyst since it has a very high activity at low temperatures. When monomethylamine is used as the starting material, cuprous chloride with methanol as a medium and potassium acetate in methanol have high activity at medium temperatures with the latter producing slightly higher conversions and with both catalysts producing light crystallization of the product from the reaction mixture in batch operation. When using a mixture of amines as the starting material, high yields can be obtained using cuprous chloride as a catalyst but at the temperatures for optimum conversion this catalyst undergoes reduction to metallic copper and therefore use of a different catalyst is advantageous. I have found that a suitable catalyst for use with mixtures of amines in my new process is boron fluoride which exhibits high activity without decomposition at the temperatures at which cuprous chloride is reduced to metallic copper. The amount of catalyst which I can employ in my process ranges from about 1 part catalyst per 4 parts amine by weight to about 1 part catalyst per 45 parts amine by weight with the amounts of cuprous chloride, cupric chloride, ammonium chloride and potassium acetate which I prefer to use being near the upper limit of this range and the amount of boron fluoride which I prefer to use being in the lower part of the range defined above.

As I have mentioned above, my reaction is carried out at elevated temperatures and pressures and I have found that the reaction should be carried out at a temperature ranging from about 50° to about 300° C. As I have previously indicated, different catalysts are particularly successful in promoting the reaction at various levels of temperatures within the range specified here. For example, cuprous chloride is particularly recommended for reacting dimethylamine at temperatures near the lower limit of the range, potassium acetate particularly suited for reacting monomethylamine at about the middle of the range specified, such as about 150 to about 200° C. and boron fluoride particularly suited for reacting mixtures of the amines at temperatures near the upper limit of the range specified such as from about 225° on up. Conversion of methylamines to N-substituted formamides appears to be directly related to pressure so that with all other conditions the same an increase in pressure increases the conversion with some conversion taking place even at atmospheric pressure. Indications are that exceptional conversions at low temperatures can be obtained at pressures as high as 15,000 pounds per square inch. However, for economical operation I prefer to operate my process at pressures ranging from about 2000 to about 5000 pounds per square inch with pressures between 3000 and 4000 pounds per square inch appearing to give exceptional results with any of the different starting materials and with any of the catalysts which I have described herein.

In carrying out my reaction, I continue to introduce carbon monoxide under pressure to the reactor containing the amine and catalyst until there is no further pressure drop indicating cessation of the absorption of carbon monoxide and completion of the reaction. This procedure serves as a definition of the amount of carbon monoxide which I use in carrying out my reaction and the time required for completion thereof. It is to be noted in this connection that when the reaction is started a pressure drop of a given magnitude occurs in a relatively short time as compared to the time required for the same pressure drop to occur after the reaction has proceeded toward completion. For this reason it is often advantageous to stop the reaction before complete cessation of the pressure drop since the additional conversion is too small to warrant expenditure of the time required for the additional carbon monoxide to be absorbed.

As I have indicated above, the reaction may be carried out in the vapor phase or in the liquid phase. Generally, the reaction is carried out in the liquid phase when temperatures below the critical temperatures for the various starting materials are employed due to the high pressure used in carrying out the process. The critical temperature for monomethylamine is 157° C., for dimethylamine 165° C., and for trimethylamine 161° C. The various possible mixtures of amines used for starting materials in this process have critical temperatures between 157° C. and 165° C. and thus in continuous operation whenever the temperature of the reaction is above 165° C. the reaction is being essentially conducted in the vapor phase regardless of which single amine or mixture of amines is used in carrying out the reaction. In batch operation enough product may be formed to act as a solvent and keep the reaction in the liquid phase even after the critical temperature of the reactants has been exceeded.

The reaction may be carried out as a continuous process or as a batch process in which latter case it is oftentimes advantageous to use a reactor in which the reactants can be agitated thus assuring good contact between reactants and catalyst. The batch process can also be successfully carried out in a stationary type reactor, satisfactory yields and conversions being obtained with this type of apparatus. In operating my new reaction as a continuous process, I have found that it is oftentimes advantageous to use a fixed bed carrier impregnated with the catalyst rather than using the catalyst in its free state or in solution in a suitable solvent.

The following examples are offered to illustrate my invention and it is to be understood that I do not intend to be limited to the exact amounts and procedures set forth therein. The scope of this invention is as defined in this specification and the attached claims and I intend for all equivalents thereof apparent to those skilled in the art to be specifically included within said scope. The term "conversion" as used in this specification and the following examples may be defined as the moles of methylformamides produced divided by the moles of total methylamines fed to the reaction. The term "yield" as used in this specification and the following examples may be defined as the number of moles of methylformamides recovered divided by the number of moles of total methylamines fed less the number of moles of methylamines recoverable.

EXAMPLE I

A series of experiments was run wherein dimethylamine and a catalyst were placed in a stainless steel bomb of a volume of 1700 ml. The bomb was rocked 58 times per minute through an arc of 30° while carbon monoxide of a purity of at least about 92% was introduced. The amount of dimethylamine, the particular catalyst, the amounts of catalyst, the temperatures, pressures, and times of reaction are shown in the following table along with the conversion to methylformamides.

*Table I*

| Dimethylamine, Grams | Catalyst | Catalyst, Grams | Temp., °C. | Press., p. s. i. | Time, Hrs. | Methyl-formamide Conversion, Percent | |
|---|---|---|---|---|---|---|---|
| | | | | | | Di | Mono |
| 112 | Cu₂Cl₂ | 20 | 189 | 4,750 | 2 | 75 | |
| 112 | Cu₂Cl₂ | 20 | 188 | 4,750 | 2 | 77 | |
| 336 | Cu₂Cl₂ | 60 | 205 | 2,860 | 2 | 88 | |
| 112 | Cu₂Cl₂ | 20 | 249 | 3,800 | 2 | 84 | |
| 112 | CuCl₂ | 20 | 209 | 4,800 | 2 | 80 | |
| 112 | CH₃COOK* | 30 | 149 | 4,800 | 4 | 89 | |
| 275 | BF₃** | 6 | 249 | 4,000 | 4 | 63 | 6 |
| 325 | BF₃** | 15 | 233 | 3,500 | 4 | 63 | 9 |
| 112 | NH₄Cl | 20 | 213 | 5,000 | 2 | 60 | |

*In methanol.
**In ethyl ether.

EXAMPLE II

A series of runs was made using a stationary stainless steel reactor of a capacity of 1800 ml. using the catalysts, the amounts of dimethylamine, the amounts of catalyst, the temperatures, the pressures, and the times shown in the following table. The results are shown as conversion and yield to dimethylformamide.

*Table II*

| Dimethylamine, Grams | Catalyst | Catalyst, Grams | Temp., °C. | Press., p. s. i. | Time, Hrs. | Dimethylformamide Conversion, Percent | Yield, Percent |
|---|---|---|---|---|---|---|---|
| 672 | Cu₂Cl₂ | 50 | 100 | 3,000 | 13 | 63 | 73 |
| 325 | Cu₂Cl₂ | 50 | 100 | 3,000 | 9 | 65 | 74 |
| 325 | Cu₂Cl₂ | 50 | 100 | 3,000 | 12 | 72 | 87 |
| 325 | Cu₂Cl₂ | 50 | 100 | 3,000 | 15 | 74 | 89 |
| 325 | CuCl₂.2H₂O | 80 | 100 | 3,000 | 8 | 35 | 42 |

EXAMPLE III

A series of runs was made using monomethylamine as the starting material and the catalysts, the amounts of catalyst, the temperatures, the pressures, and the times of reaction shown in the following table. The results as shown in the table are expressed in percent conversion to methylformamides. The reaction was carried out in a reactor of the type described in Example I.

*Table III*

| Monomethylamine, Grams | Catalyst | Catalyst, Grams | Temp., °C. | Press., p. s. i. | Time, Hrs. | Methylformamide Conversion, Percent | |
|---|---|---|---|---|---|---|---|
| | | | | | | Mono | Di |
| 112 | CH₃COOK* | 30 | 227 | 2,800 | 2 | 76 | 10 |
| 336 | CH₃COOK* | 30 | 154 | 3,500 | 4 | 82 | 1 |
| 325 | CH₃COOK* | 30 | 160 | 3,500 | 5 | 92 | 1 |
| 325 | BF₃** | 15 | 232 | 3,500 | 4 | 49 | 16 |

* In methanol.
** In ethyl ether.

EXAMPLE IV

A series of experiments was carried out wherein various mixtures of methylamines were employed as the starting material in the production of dimethylformamide. The catalyst used, the amount of catalyst, the temperature, pressure, and time of reaction in each of the experiments is shown in the following table. The results are expressed in terms of percent conversion to methylformamides. The reactor used in this series of experiments was the one described in Example I.

Table IV

| Methylamines, Grams | | | Catalyst | Catalyst, Grams | Temp., °C. | Press., p. s. i. | Time, Hrs. | Methyl formamide Conversion, Percent | |
|---|---|---|---|---|---|---|---|---|---|
| Mono | Di | Tri | | | | | | Mono | Di |
| 110 | 108 | 103 | NH₄Cl | 5 | 238 | 3,500 | 4 | 27 | 44 |
| 112 | 210 | -- | BF₃* | 7.7 | 232 | 2,700 | 4 | 24 | 36 |
| 102 | 104 | 101 | BF₃* | 5 | 232 | 3,500 | 4 | 22 | 47 |
| 112 | -- | 112 | BF₃* | 15 | 232 | 4,000 | 2 | 21 | 36 |
| 112 | -- | 112 | BF₃* | 5 | 232 | 3,900 | 4 | 26 | 34 |

* In ethyl ether.

EXAMPLE V

A reactor for continuous operation was constructed of a 57 inch length of stainless steel pipe having an inside diameter of 2.6 inches and an outside diameter of 4.5 inches having caps with connections for reactant inlet and product outlet at each end. Aluminum oxide catalyst carrier was soaked in an acidic solution of cuprous chloride and subsequently the impregnated carrier was dried. The reactor was then filled with the carrier impregnated with the catalyst. Dimethylamine was introduced into the reactor through a high pressure pump and carbon monoxide, maintained at a pressure of 3000 pounds per square inch by an automatic regulator, was fed to the reactor through direct piping. Heat was supplied by 3 electrical heaters, the temperature being raised to 235° C. for 12 hours during which time 511 grams of dimethylamine were introduced. From the reactor was taken continuously a total of 617 grams of dimethylformamide and 58 grams of monomethylformamide for a total methylformamides conversion of 83%.

Now having described my invention what I claim is:

1. A process for the production of N-substituted formamides having the formula

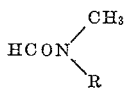

where R is selected from the group consisting of hydrogen and methyl which comprises reacting a material selected from the group consisting of monomethylamine, dimethylamine, a mixture of monomethylamine and dimethylamine, a mixture of a substantial proportion of monomethylamine and trimethylamine, a mixture of a substantial proportion of dimethylamine and trimethylamine, and a mixture of a substantial proportion of monomethylamine, a substantial proportion of dimethylamine and trimethylamine with carbon monoxide in the presence of a catalyst selected from the group consisting of cuprous chloride, cupric chloride, ammonium chloride, potassium acetate and boron fluoride at a temperature between about 50 and 300° C. and a pressure between about 1,000 and 15,000 pounds per square inch.

2. A process for the production of dimethylformamide which comprises reacting dimethylamine with carbon monoxide in the presence of a catalyst selected from the group consisting of cuprous chloride, cupric chloride, ammonium chloride, potassium acetate and boron fluoride at a temperature between 50 and 300° C. and a pressure between 1,000 and 15,000 pounds per square inch.

3. A process for the production of methylformamides which comprises reacting a mixture of monomethylamine and dimethylamine with carbon monoxide in the presence of boron fluoride catalyst at a temperature ranging from about 200 to 250° C. and a pressure ranging from about 3,000 to about 4,000 pounds per square inch.

4. A process for the production of dimethylformamide which comprises reacting dimethylamine with carbon monoxide in the presence of cuprous chloride catalyst at a temperature ranging from about 100° to about 150° C. and a pressure ranging from about 3000 to about 4000 pounds per square inch.

5. A process for the production of methylformamides which comprises reacting monomethylamine with carbon monoxide in the presence of potassium acetate catalyst at a temperature ranging from about 150° to about 200° C. and a pressure ranging from about 3000 to about 4000 pounds per square inch.

6. A process for the production of N-substituted formamides having the formula

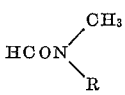

where R is selected from the group consisting of hydrogen and methyl which comprises reacting monomethylamine with carbon monoxide in the presence of a catalyst selected from the group consisting of cuprous chloride, cupric chloride, ammonium chloride, potassium acetate and boron fluoride at a temperature between about 50 and 300° C. and a pressure between about 1,000 and 15,000 pounds per square inch.

7. A process for the production of N-substituted formamides having the formula

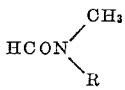

where R is selected from the group consisting of hydrogen and methyl which comprises reacting a mixture of a substantial proportion of monomethylamine, a substantial proportion of dimethylamine and trimethylamine with carbon monoxide in the presence of boron fluoride catalyst at a temperature ranging from about 200 to 250° C. and a pressure ranging from about 3,000 to about 4,000 pounds per square inch.

8. A process for the production of N-substituted formamides having the formula

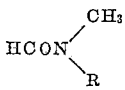

where R is selected from the group consisting of hydrogen and methyl which comprises reacting a mixture of a substantial proportion of monomethylamine and trimethylamine with carbon monoxide in the presence of boron fluoride catalyst at a temperature ranging from about 200 to about 250° C. and a pressure ranging from about 3,000 to about 4,000 pounds per square inch.

References Cited in the file of this patent

UNITED STATES PATENTS

| Number | Name | Date |
|---|---|---|
| 1,567,312 | Wietzel | Dec. 29, 1925 |
| 1,777,777 | Wietzel | Oct. 7, 1930 |
| 2,204,371 | Loder | June 11, 1940 |
| 2,310,478 | Tyerman | Feb. 9, 1943 |
| 2,422,631 | Olin et al. | June 17, 1947 |
| 2,479,205 | Buckley et al. | Aug. 16, 1949 |

FOREIGN PATENTS

| Number | Country | Date |
|---|---|---|
| 879,486 | France | Nov. 19, 1942 |